United States Patent
Montenegro et al.

(10) Patent No.: US 11,350,651 B2
(45) Date of Patent: Jun. 7, 2022

(54) INDIAN GOOSEBERRY EXTRACT AS A NATURAL COLOR STABILIZER FOR BEVERAGES

(71) Applicant: TALKING RAIN BEVERAGE COMPANY, INC., Preston, WA (US)

(72) Inventors: Rachel Nicole Montenegro, Seattle, WA (US); Kraig Allen Van Wieringen, Seattle, WA (US); Emma Kate Stewart, Issaquah, WA (US); Jagriti Sharma, Issaquah, WA (US); Erik Throndsen, Maple Valley, WA (US)

(73) Assignee: TALKING RAIN BEVERAGE COMPANY, INC., Preston, WA (US)

( * ) Notice: Subject to any disclaimer, the term of this patent is extended or adjusted under 35 U.S.C. 154(b) by 264 days.

(21) Appl. No.: 15/906,683

(22) Filed: Feb. 27, 2018

(65) Prior Publication Data
US 2019/0261658 A1  Aug. 29, 2019

(51) Int. Cl.
| A23L 5/41 | (2016.01) |
| A23L 2/58 | (2006.01) |
| A23L 5/44 | (2016.01) |
| A23L 2/44 | (2006.01) |

(52) U.S. Cl.
CPC ............. *A23L 5/41* (2016.08); *A23L 2/44* (2013.01); *A23L 2/58* (2013.01); *A23L 5/44* (2016.08); *A23V 2002/00* (2013.01)

(58) Field of Classification Search
None
See application file for complete search history.

(56) References Cited

U.S. PATENT DOCUMENTS

| 5,607,707 | A | * | 3/1997 | Ford | A61K 8/31 |
| | | | | | 426/2 |
| 6,007,856 | A | * | 12/1999 | Cox | A23L 5/44 |
| | | | | | 426/250 |
| 6,635,293 | B2 | * | 10/2003 | Fullmer | A23L 5/44 |
| | | | | | 424/442 |
| 2005/0244349 | A1 | * | 11/2005 | Chaudhuri | A61K 8/37 |
| | | | | | 424/59 |
| 2010/0151084 | A1 | | 6/2010 | Roy et al. | |
| 2010/0215783 | A1 | * | 8/2010 | McNeary | A61K 36/45 |
| | | | | | 424/732 |
| 2013/0022712 | A1 | | 1/2013 | Roy et al. | |

FOREIGN PATENT DOCUMENTS

| CN | 107105729 A | | 8/2017 | | |
| IN | 201402880 | | 9/2014 | | |
| JP | 55148076 A | * | 11/1980 | | |
| JP | 2002218940 A | * | 8/2002 | | |
| JP | 2002-338842 | | 11/2002 | | |
| WO | WO-2014023712 A1 | * | 2/2014 | ............ | A23G 3/343 |
| WO | WO-2015090697 A1 | * | 6/2015 | ............ | A61K 8/602 |

OTHER PUBLICATIONS

"Standardized extract of Emblica officinalis", https://www.naturalremedy.com/Emblica%20officinalis.pdf, Nov. 10, 2012 (as reported by the Waybackmachine), pp. 1. (Year: 2012).*
English Translation of Kodama, JP2002218940 A, pp. 1-5. (Year: 2002).*
Hossain, M.N., Fakruddin, M., Islam, M.N. 2011. "Effect of Chemical Additives on the Shelf Life of Tomato Juice." vol. 6, pp. 914-923.*
Lin, C.H., Chen, B.H. 2003. "Determination of carotenoid in tomato juice by liquid chromatography." Journal of Chromatography A. vol. 1012, pp. 103-109.*
B. Nanditha, et al., "Antioxidants in Baker Products: A Review", Critical Reviews in Food Science and Nutrition, 49:1, 1-27, DOI:10.1080/10408390701764104, Published online: Jan. 7, 2009.
"GRAS Notification for Amla Concentrate", Office of Food Additive Safety, Jul. 8, 2013, 47 pp.).
Nour-Eddine Es-Safi, et al., "Flavonoids: Hemisynthesis, Reactivity, Characterization and Free Radical Scavenging Activity", Molecules 2007, 12, 2228-2258.
Ghanshyam Das Sahu, "Studies on Processing Technology and Shelf Life of Value Added Products of Aonla", Department of Horticulture, College of Agriculture Indira Gandhi Krishi Vishwavidyalaya Raipur (C.G.) 2007.
Awsi Jan, et al., "Development and Quality Evaluation of Pineapple Juice Blend with Carrot and Orange juice", International Journal of Scientific and Research Publications, vol. 2, Issue 8, Aug. 2012, 8pp.

\* cited by examiner

*Primary Examiner* — Nikki H. Dees
(74) *Attorney, Agent, or Firm* — Oblon, McClelland, Maier & Neustadt, L.L.P.

(57) ABSTRACT

A beverage containing a natural colorant and one or more components of an Indian gooseberry extract and having sufficient color photostability is described. The active component in the Indian gooseberry extract is at least one of tannic acid, chebulinic acid, chebulagic acid, and phyllemblin. The natural colorant is a carotenoid and/or an anthocyanin. When the natural colorant is beta-carotene, it is preferably provided in a form of microemulsion. The beverage further contains a preservative, such as benzoic acid, sorbic acid, and a salt thereof. A method of formulating the beverage is also described.

20 Claims, No Drawings

INDIAN GOOSEBERRY EXTRACT AS A NATURAL COLOR STABILIZER FOR BEVERAGES

FIELD OF THE APPLICATION

This application relates to beverages containing one or more components of an Indian gooseberry extract as a natural color stabilizer. In particular, this application relates to beverages containing colorants derived from natural sources, such as carotenoids and anthocyanins, and one or more components of an Indian gooseberry extract in an amount sufficient to stabilize the color of the colorants so that fading of the color when the beverage is exposed to light is effectively inhibited.

BACKGROUND

A primary obstacle with the use of natural colors in beverage formulations is color and flavor stability and light degradation. When the beverage formulations are exposed to UV light, many natural colors chemically degrade over time, causing a shift or fading of color as well as potential taste off-notes. Natural pigments that range in color from red to orange to yellow, for example, carotenoids, both xanthophylls and carotenes such as beta-carotene, are particularly susceptible to UV degradation. Anthocyanins, which are water-soluble vacuolar pigments that, depending on their pH, may appear red, purple, or blue, are also susceptible to UV degradation.

The industry standard is the addition of ascorbic acid (Vitamin C) to naturally-colored beverage formulations to prevent the light-induced degradation due to its function as an antioxidant. While adding ascorbic acid is effective in stabilizing natural colors, it presents alternate formulation challenges. For example, common preservatives, such as potassium benzoate, tend to react with ascorbic acid and form benzene, which is known as a carcinogenic compound. Therefore, it is desired to have a beverage containing a color stabilizer, which is derived from a natural source and has a lower likelihood of reaction with common preservatives.

An objective of the present application is to provide a beverage that contains natural colorants and natural color stabilizers, in order to have sufficient color stability. This and other objectives have been achieved according to the present application.

SUMMARY

In certain embodiments of the present application, a beverage that contains water, a natural colorant, and one or more components of an Indian gooseberry extract in an amount sufficient to stabilize color of the natural colorant is provided. Indian gooseberry extract may contain components, such as tannic acid, gallic acid, ellagic acid, corilagin acid, chebulinic acid, chebulagic acid, phyllemblin (ethyl gallate), and ascorbic acid. However, it is believed that the active components in the Indian gooseberry extract that stabilizes color include tannic acid, chebulinic acid, chebulagic acid, and phyllemblin (ethyl gallate).

In other embodiments, the beverage further contains a preservative. The preservative is one or more of benzoic acid, sorbic acid, and a salt thereof. In particular, the preservative is potassium benzoate.

In some other embodiments, the natural colorant in the beverage is a carotenoid, an anthocyanin, or a combination of a carotenoid and an anthocyanin. In particular, the natural colorant is beta-carotene, which is in a microemulsion form.

In some other embodiments, the Indian gooseberry extract is present in an amount ranging from 0.015% to 0.1% by weight, preferably, from 0.03% to 0.07% by weight, and more preferably, from 0.04% to 0.05% by weight, based on a total weight of the beverage.

In some other embodiments, the content of ascorbic acid in the beverage is kept low. In particular, the content of ascorbic acid is below 0.004% by weight, preferably below 0.003% by weight, and more preferably, below 0.0015% by weight, based on the total weight of the beverage.

In some other embodiments, the content of gallic acid in the beverage is kept low. In particular, the content of gallic acid is below 0.017% by weight, preferably below 0.007% by weight, and more preferably, below 0.00002% by weight, based on the total weight of the beverage.

In addition, a method of preserving color and appearance of a beverage containing a natural colorant is provided. The method includes a step of formulating Indian gooseberry extract or one or more components thereof in the beverage containing a natural colorant where the amount of the Indian gooseberry extract or the one or more components thereof is sufficient to stabilize the color of the natural colorant.

The foregoing paragraphs have been provided by way of general introduction, and are not intended to limit the scope of the following claims. The described embodiments, together with further advantages, will be best understood by reference to the following detailed description and examples.

DETAILED DESCRIPTION

Indian gooseberry is also known as amla or phyllanthus emblica or emblica officinalis. Through diligent studies, the Inventors have discovered that the addition of Indian gooseberry extract or one or more components thereof to a natural colorant-containing beverage formulation, such as a beta carotene-containing beverage formulation and an anthocyanin-containing beverage formulation, diminishes the light-induced color degradation observed without this addition.

In particular, photostability tests were performed on various flavored formulations A-C, formed with spring water or reverse osmosis (RO) water. The A and B formulations both contain beta-carotenes. The C formulation contains anthocyanins and beta carotenes in combination. Potassium benzoate was added to the beverage formulations as the preservative. Samples with no color stabilizer, ascorbic acid, or Indian gooseberry extract were tested. Color appearance of each sample after the sample was subjected to light was compared with its corresponding control sample, which was the same beverage formulation except that it did not contain any color stabilizer and was not subjected to light.

The results are summarized in Table 1, in which, following visual evaluation, "pass" means the sample had a color appearance matching the control sample and "fail" means the sample had a faded color. It is clear from Table 1 that, if there was no color stabilizer added to the beverage formulation, the color faded significantly after the beverage was subjected to light. However, the addition of Indian gooseberry extract could provide a beverage formulation that still had a color matching the control sample even after the beverage formulation is subjected to light, as long as it was added in a sufficient amount. The particular amount of an Indian gooseberry extract that is sufficient to stabilize the color of a natural colorant can be determined by creating samples containing varying levels of Indian Gooseberry extract and performing the photostability tests. Measurements are then taken using a colorimeter to analyze which level of Indian Gooseberry extract is effective for color protection. It is found that the color stabilization effect of Indian gooseberry extract is comparable to, and for some beverage formulations, even improved over, the color stabilization effect of ascorbic acid.

effect of Indian gooseberry extract is due to the interaction between the natural colorants and Indian gooseberry extract's active components, such as tannic acid, chebulinic acid, chebulagic acid, and phyllemblin (ethyl gallate).

Indian gooseberry extract can be used with a natural colorant in various forms, for example, as a regular emulsion or microemulsion. As illustrated below by examples, a particularly effective use of Indian gooseberry extract is in combination with beta-carotene that is in the form of a microemulsion.

In addition to preventing natural color degradation, Indian gooseberry extract is also found to be effective for the protection of flavor and to provide a general preservative function for the beverage as a whole, such as preventing the growth of lactic acid bacteria, mold, and yeast.

Having generally described the application, a further understanding of the application can be obtained by reference to the specific examples provided thereafter for purposes of illustration only. It is to be understood that these examples are not intended to be limiting the scope of the present application and are indicative of a few of the various ways and aspects in which the principles of the present application may be employed and the present application is intended to include all such aspects and their equivalents.

TABLE 1

| Beverage formulation | Natural colorant | Water type | Potassium Benzoate | Color stabilizer none | Ascorbic acid (420 ppm) | Indian gooseberry Extract (200-500 ppm) |
|---|---|---|---|---|---|---|
| A | Beta-carotene | Spring | 500 ppm | fail | pass | pass |
|   |   | RO |   | fail | pass | pass |
| B | Beta-carotene | Spring | 500 ppm | fail | pass | pass |
|   |   | RO |   | fail | pass | pass |
| C | Beta-carotene & Anthocyanin | Spring | 500 ppm | fail | fail | fail |
|   |   | RO |   | fail | pass | pass |

Indian gooseberry extracts from different sources vary in the particular contents of the components contained therein. Although Indian gooseberry extract contains ascorbic acid, it is known that ascorbic acid is only a minor component.

It is believed that the active components in Indian gooseberry extract that stabilizes the color include tannic acid, chebulinic acid, chebulagic acid, and phyllemblin (ethyl gallate). Typically, tannic acid ranges from 25% to 63%, chebulinic acid ranges from 5% to less than 40%, chebulagic acid ranges from 5% to less than 40%, and phyllemblin ranges from 5% to less than 40%, based on the total weight of the Indian gooseberry extract.

Table 2 summarizes the contents of some components of the Indian gooseberry extracts from Source A and Source B, respectively.

TABLE 2

| Components | Source A | Source B |
|---|---|---|
| Ascorbic acid (% by weight) | 3.15-4.15 | 2.38-3.38 |
| Gallic acid (% by weight) | 0.03-0.05 | 16.00-17.00 |
| Tannic acid (% by weight) | 28.5-41.5 | 59.5-62.5 |
| Ellagic acid (% by weight) | 1.95-2.95 | 3.05-4.05 |

It is clear from Table 2 that Indian gooseberry extracts from Source A and Source B differ in the particular contents of the components contained therein. In addition, as shown in Table 2, ascorbic acid is present in both Source A and Source B only in a negligible amount. Therefore, ascorbic acid is likely not an active component in Indian gooseberry extract that functions as a color stabilizer.

A notable difference between the Indian gooseberry extract from Source A and the Indian gooseberry extract from Source B is the content of gallic acid. In particular, the Indian gooseberry extract from Source A contains only 0.03-0.05% of gallic acid; while the Indian gooseberry extract from Source B contains 16.00-17.00% of gallic acid. Because the Indian gooseberry extract from Source A is found to be more effective in inhibiting fading of color than the Indian gooseberry extract from Source B, gallic acid, just like ascorbic acid, is not believed to be a particularly active component in Indian gooseberry extract that stabilizes the color.

While not wishing to be bound by theory, it is believed that the surprisingly remarkable natural color stabilizing

EXAMPLES

Among various beverage formulations tested by the Inventors, those which contained beta-carotene as the main natural colorant were found to be particularly susceptible to UV degradation. Therefore, beta-carotene-containing formulations (V1, V2, and V3 as listed in Table 3) with the addition of Indian gooseberry extract from different sources and beta-carotene in different forms were tested for photostability testing and incubator stability testing.

TABLE 3

|    | Source of Indian gooseberry extract | Form of beta-carotene |
|---|---|---|
| V1 | Source A | Emulsion |
| V2 | Source A | Microemulsion |
| V3 | Source B | Microemulsion |

Detailed procedures for photostability testing and incubator stability testing are described below.

[Photostability Testing]

Each sample for photostability testing is prepared by filling in a 500 ml PET bottle with the required mass of a base solution, and then diluting the base solution to a predetermined volume with carbonated water. For each base solution, enough bottles are prepared for multiple testing timepoints as well as control standards. The sample testing times attempt to approximate a real-time equivalence of several months.

Appearance is qualitatively evaluated by visual comparison of samples in a light box and quantitatively evaluated using a colorimeter. In order to evaluate organoleptic impact, single blind tasting or triangle taste test methodology is utilized to analyze the results.

[Incubator Stability Testing]

Each sample for incubator stability testing is prepared by filling a 500 ml PET bottle or a 12-oz aluminum can with the required mass of a base solution, and then diluting the base solution to a predetermined volume with carbonated water. The carbonation must meet product specification. For each base solution, enough bottles or cans are prepared for multiple testing timepoints as well as control standards. The sample testing times attempt to approximate a real-time equivalence of several months.

Appearance is qualitatively evaluated by visual comparison of samples in a light box and quantitatively evaluated using a colorimeter. In order to evaluate organoleptic impact, single blind tasting or triangle taste test methodology is utilized to analyze the results.

The testing results were summarized in Tables 4-6.

TABLE 4

Testing results for V1

| Use | Time Point Equivalence | L* | a* | b* | dL | da | db | dE*2000 | Average |
|---|---|---|---|---|---|---|---|---|---|
| Standard | | 89.63 | 0.81 | 15.08 | 0.00 | 0.00 | 0.00 | | |
| Photostability | 3 months | 89.77 | 1.04 | 14.49 | 0.14 | 0.23 | 0.59 | 0.47 | 0.822 |
| | | 90.19 | 1.00 | 13.40 | 0.56 | 0.19 | 1.68 | 1.08 | |
| | | 90.20 | 1.00 | 13.39 | 0.57 | 0.19 | 1.69 | 1.09 | |
| | | 90.11 | 1.03 | 13.81 | 0.48 | 0.22 | 1.27 | 0.85 | |
| | | 89.68 | 1.04 | 14.20 | 0.05 | 0.23 | 0.88 | 0.62 | |
| | 9 months | 90.60 | 0.85 | 10.17 | 0.97 | 0.04 | 4.91 | 3.16 | 2.682 |
| | | 90.25 | 1.02 | 12.46 | 0.62 | 0.21 | 2.62 | 1.67 | |
| | | 89.92 | 1.08 | 12.11 | 0.29 | 0.27 | 2.97 | 1.90 | |
| | | 90.07 | 0.89 | 10.18 | 0.44 | 0.08 | 4.90 | 3.14 | |
| | | 90.23 | 0.85 | 9.60 | 0.60 | 0.04 | 5.48 | 3.54 | |
| Incubator | 3 months | 89.73 | 1.38 | 12.29 | 0.10 | 0.57 | 2.79 | | 1.75 |
| | 6 months | 89.97 | 1.34 | 11.79 | 0.34 | 0.53 | 3.29 | | 2.36 |
| | 9 months | 90.32 | 1.24 | 10.90 | 0.69 | 0.43 | 4.18 | | 2.85 |

TABLE 5

Testing results for V2

| Use | Time Point Equivalence | L* | a* | b* | dL | da | db | dE*2000 | Average |
|---|---|---|---|---|---|---|---|---|---|
| Standard | | 86.73 | 1.30 | 18.71 | 0.00 | 0.00 | 0.00 | | |
| Photostability | 3 months | 86.88 | 1.44 | 17.80 | 0.15 | 0.14 | 0.91 | 0.61 | 0.618 |
| | | 85.78 | 1.52 | 17.92 | 0.95 | 0.22 | 0.79 | 0.61 | |
| | | 86.94 | 1.60 | 17.61 | 0.21 | 0.30 | 1.10 | 0.73 | |
| | | 86.84 | 1.56 | 17.88 | 0.11 | 0.26 | 0.83 | 0.57 | |
| | | 86.85 | 1.55 | 17.88 | 0.12 | 0.25 | 0.83 | 0.57 | |
| | 9 months | 87.44 | 1.35 | 15.13 | 0.71 | 0.05 | 3.58 | 2.07 | 2.052 |
| | | 86.06 | 1.25 | 16.14 | 0.67 | 0.05 | 2.57 | 1.46 | |
| | | 84.34 | 1.25 | 15.22 | 2.39 | 0.05 | 3.49 | 2.14 | |
| | | 87.00 | 1.29 | 15.10 | 0.27 | 0.01 | 3.61 | 2.07 | |
| | | 87.96 | 1.27 | 14.39 | 1.23 | 0.03 | 4.32 | 2.52 | |

TABLE 6

Testing results for V3

| Use | Time Point Equivalence | L* | a* | b* | dL | da | db | dE*2000 | Average |
|---|---|---|---|---|---|---|---|---|---|
| Standard | | 86.14 | 1.77 | 17.82 | 0.00 | 0.00 | 0.00 | | |
| Photostability | 3 months | 86.14 | 1.88 | 15.13 | 0.00 | 0.11 | 2.69 | 1.43 | 1.332 |
| | | 86.78 | 2.03 | 15.63 | 0.64 | 0.26 | 2.19 | 1.36 | |
| | | 86.91 | 1.99 | 15.55 | 0.77 | 0.22 | 2.27 | 1.39 | |
| | | 86.91 | 1.99 | 15.55 | 0.77 | 0.22 | 2.27 | 1.40 | |
| | | 85.96 | 2.02 | 16.08 | 0.18 | 0.25 | 1.74 | 1.08 | |

TABLE 6-continued

Testing results for V3

| Use | Time Point Equivalence | L* | a* | b* | dL | da | db | dE*2000 | Average |
|---|---|---|---|---|---|---|---|---|---|
| | 9 months | 86.91 | 1.37 | 11.63 | 0.77 | 0.40 | 6.19 | 3.74 | 3.448 |
| | | 87.47 | 1.39 | 12.40 | 1.33 | 0.38 | 5.42 | 3.27 | |
| | | 85.45 | 1.11 | 10.55 | 0.69 | 0.66 | 7.27 | 4.47 | |
| | | 87.69 | 1.54 | 13.05 | 1.55 | 0.23 | 4.77 | 2.86 | |
| | | 87.39 | 1.51 | 12.97 | 1.25 | 0.26 | 4.85 | 2.90 | |
| Incubator | 3 months | 86.02 | 1.81 | 11.20 | 0.12 | 0.04 | 6.62 | | 4.16 |
| | 6 months | 88.41 | 1.59 | 9.21 | 2.27 | 0.18 | 8.61 | | 5.78 |
| | 9 months | 88.56 | 1.83 | 10.07 | 2.42 | 0.06 | 7.75 | | 5.35 |

For each beverage formulation, a standard color value was first established. A dE*2000 value was then obtained for each testing sample when the color value of the testing sample was compared to the standard. Therefore, the dE*2000 value gives a quantifiable number to the difference in color, including the lightness, hue, and saturation measured between two color samples. A dE*2000 value under 2 is considered by industry standard as non-perceptible to the human eye. In the present application, a dE*2000 value of 3.5 or under at the end of 9 months of photostability testing is set as acceptable.

As shown in Tables 4-6, Indian gooseberry extract could effectively stabilize color of the formulations. In addition, as evident by the comparison between data in Table 4 and Table 5, the color stabilization was particularly effective when beta-carotene was in a microemulsion form.

While specific embodiments of the application have been described in detail, it will be appreciated by those skilled in the art that various modifications and alternatives to those details could be developed in light of the overall teachings of the disclosure. Accordingly, the particular embodiments disclosed are meant to be illustrative only and not limiting of the scope of the application, which is to be given the full breadth of the appended claims and any and all equivalents thereof.

What is claimed is:

1. A beverage, comprising:
   water;
   a natural colorant, wherein the natural colorant is a carotenoid; and
   an Indian gooseberry extract in an amount sufficient to photostabilize the color of the natural colorant such that a dE*2000 value for the beverage is under 2 after 3 months,
   wherein a content of ascorbic acid in the beverage is below 0.004% by weight, based on a total weight of the beverage.

2. The beverage of claim 1, wherein the Indian gooseberry extract comprises one or more components selected from the group consisting of tannic acid, chebulinic acid, chebulagic acid, and phyllemblin.

3. The beverage of claim 1, further comprising:
   a preservative.

4. The beverage of claim 3, wherein the preservative is at least one selected from the group consisting of benzoic acid and a salt thereof.

5. The beverage of claim 3, wherein the preservative comprises potassium benzoate.

6. The beverage of claim 1, wherein the carotenoid is beta-carotene.

7. The beverage of claim 6, wherein beta-carotene is in a microemulsion form.

8. The beverage of claim 1, wherein the Indian gooseberry extract is present in an amount ranging from 0.015% to 0.1% by weight, based on a total weight of the beverage.

9. The beverage of claim 8, wherein the content of ascorbic acid in the beverage is below 0.0015% by weight, based on a total weight of the beverage.

10. The beverage of claim 1, wherein a content of gallic acid in the beverage is below 0.017% by weight, based on a total weight of the beverage.

11. A method of stabilizing a natural colorant in a beverage, the method comprising:
    formulating a beverage comprising an Indian gooseberry extract and a natural colorant, wherein the natural colorant is a carotenoid,
    wherein the Indian gooseberry extract is added in an amount sufficient to photostabilize color of the natural colorant such that a dE*2000 value for the beverage is under 2 after 3 months,
    wherein a content of ascorbic acid in the beverage is below 0.004% by weight, based on a total weight of the beverage.

12. The method of claim 11, wherein the Indian gooseberry extract comprises one or more components selected from the group consisting of tannic acid, chebulinic acid, chebulagic acid, and phyllemblin.

13. The method of claim 11, wherein the natural colorant is beta-carotene in a microemulsion form.

14. The method of claim 11, wherein 0.015 to 0.1% by weight of the Indian gooseberry extract, based on a total weight of the beverage, is added and wherein the content of ascorbic acid in the beverage is below 0.0015% by weight, based on a total weight of the beverage.

15. The method of claim 11, wherein the beverage further comprises at least one preservative selected from the group consisting of benzoic acid and a salt thereof.

16. The beverage of claim 1, further comprising an anthocyanin.

17. The beverage of claim 1, wherein the beverage is carbonated.

18. The method of claim 11, wherein the beverage is carbonated.

19. A beverage, comprising:
    water;
    a natural colorant, wherein the natural colorant is a carotenoid; and
    an Indian gooseberry extract in an amount sufficient to photostabilize the color of the natural colorant such that a dE*2000 value for the beverage is under 3.5 after 9 months, wherein the content of the Indian gooseberry extract is 0.015 to 0.1% by weight, based on a total weight of the beverage, wherein the content of ascorbic acid in the beverage is below 0.0015% by weight, based on a total weight of the beverage, and wherein the beverage further comprises at least one preservative selected from the group consisting of benzoic acid and a salt thereof.

20. The method of claim 11, wherein the Indian gooseberry extract further photostabilizes color of the natural colorant such that a dE*2000 value for the beverage is under 3.5 after 9 months.

* * * * *